UNITED STATES PATENT OFFICE.

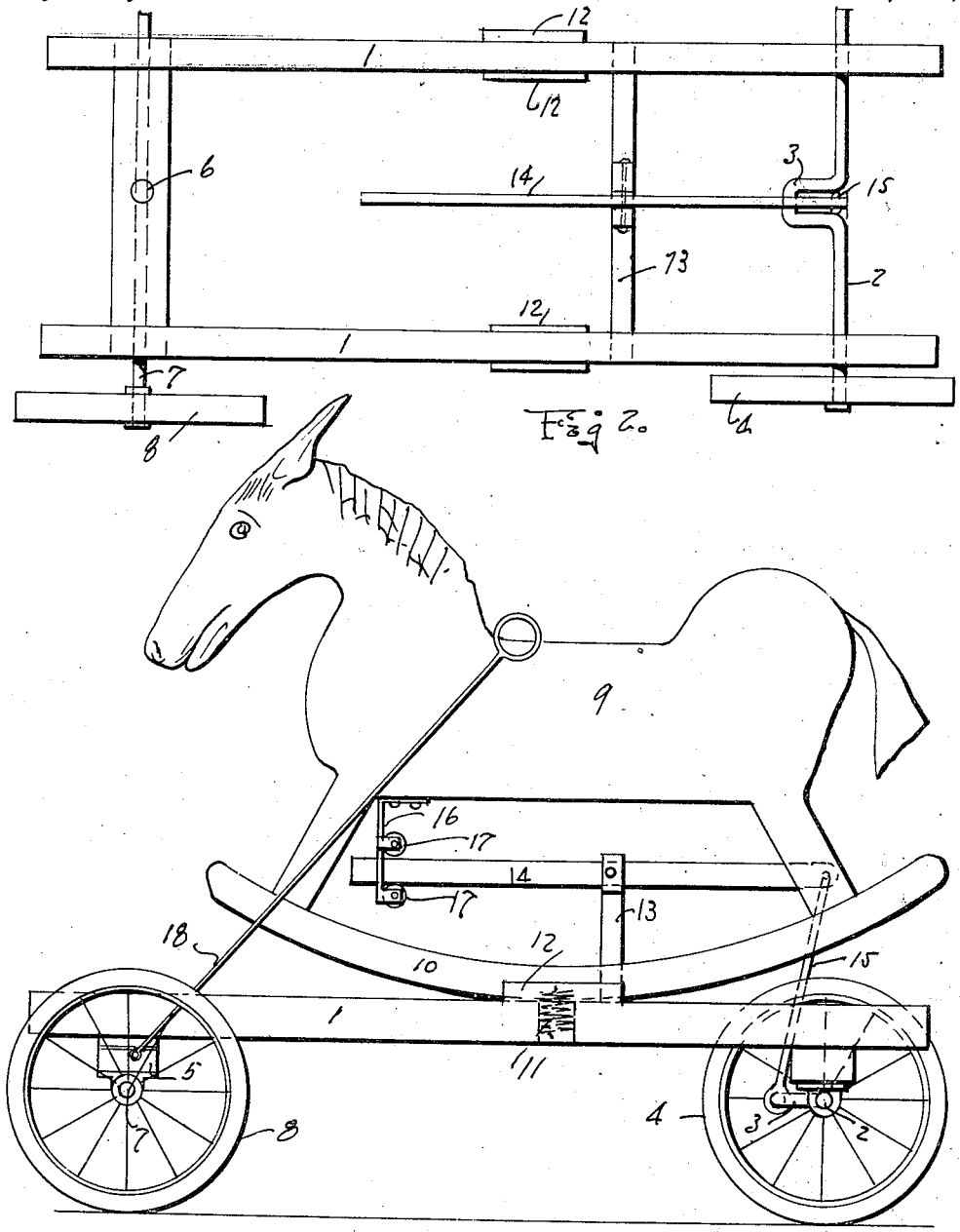

PAUL A. DAVIS, OF SEQUIM, WASHINGTON.

TOY.

1,254,887. Specification of Letters Patent. Patented Jan. 29, 1918.

Application filed April 25, 1917. Serial No. 164,330.

*To all whom it may concern:*

Be it known that I, PAUL A. DAVIS, a citizen of the United States, residing at Sequim, in the county of Clallam and State of Washington, have invented certain new and useful Improvements in Toys, of which the following is a specification.

This invention relates to toys and more particularly to hobby horses and has for its principal object to provide an improved and novel rocking hobby horse with a wheeled mounting and means for propelling the wheeled mounting by the rocking action of the hobby horse. Another object of my device is to provide a hobby horse which is propelled by the rocking action of the occupant.

Other objects will appear as my invention is more fully explained in the following specification, illustrated in the accompanying drawings and pointed out in the appended claim.

In the drawings, Figure 1 is a side elevation of my device with one of the rear wheels omitted. Fig. 2 is a plan view of the wheeled mounting of Fig. 1 with parts omitted.

Referring more particularly to the drawings, numeral 1 indicates a frame work upon the rear end of which is revolubly mounted a rear axle 2 having a crank 3. Wheels 4 are secured to either end of axle 2. Upon the front end of frame 1 a bolster 5 is swingably mounted by means of a king pin 6. An axle 7 is secured to bolster 5 and provides bearing for front wheels 8. Upon frame 1 a rocking hobby horse 9 is mounted. The hobby horse 9 is supported upon curved rockers 10 which rest directly upon the frame members 1, and are normally held in a balanced position and against excessive movement by means of springs 11 and side plates 12. A standard 13 is erected intermediate the frame members 1 and beneath the horse 9. A walking beam 14 is pivotally mounted to standard 13 near its center. The rear end of walking beam 14 is connected to crank 3 by means of a crank rod 15, while the forward end of the walking beam is slidably mounted into bracket 16 which is secured to the front end of horse 9. I prefer to mount the front end of beam 14 between rollers 17 which are revolubly mounted on bracket 16. Hand rods 18 may be secured to either end of bolster 5 in order that occupant of the horse may guide the device. In operation the occupant of the horse rocks the horse backward and forward in the usual manner and the up and down motion of the front end of the horse moves walking beam 14 about the pivot point thereby operating crank 3. As wheels 4 are secured to shaft 2, it will be apparent that the operation of crank 3 will propel the device.

While I have shown a particular form of embodiment of my invention, I am aware that many minor changes therein will readily suggest themselves to others skilled in the art without departing from the spirit and scope of the invention, and I therefore desire to avoid being limited to the exact form shown and described.

Having described my invention, what I claim as new and desire to protect by Letters Patent, is—

The combination with a rocking hobby horse of a frame work upon which the rockers of the hobby horse rest, a crank shaft revolubly mounted upon said frame work, traction wheels secured to said crank shaft, a walking beam pivotally secured to said frame work, a crank rod connecting one end of said walking beam to the said crank, a bracket secured to the said hobby horse and coöperating with the other end of the said walking beam, whereby a rocking motion of the hobby horse will rotate the crank shaft and cause the traction wheels to revolve.

In testimony whereof I affix my signature.

PAUL A. DAVIS.